(12) United States Patent
Gray et al.

(10) Patent No.: US 6,862,618 B1
(45) Date of Patent: Mar. 1, 2005

(54) OPTIMAL LINK SCHEDULING FOR MULTIPLE LINKS

(75) Inventors: James P. Gray, Chapel Hill, NC (US); James J. Martin, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/565,114

(22) Filed: May 4, 2000

Related U.S. Application Data

(62) Division of application No. 08/878,006, filed on Jun. 18, 1997, now Pat. No. 6,178,448.

(51) Int. Cl.⁷ ........................ G06F 15/173; G06F 15/16
(52) U.S. Cl. ........................ 709/224; 709/232; 370/468
(58) Field of Search ................................. 709/224, 232, 709/233; 370/468, 465, 230, 238, 412

(56) References Cited

U.S. PATENT DOCUMENTS

| | | | |
|---|---|---|---|
| 5,050,161 A | | 9/1991 | Golestani |
| 5,124,943 A | | 6/1992 | Lubarsky |
| 5,138,615 A | | 8/1992 | Lamport et al. |
| 5,233,604 A | * | 8/1993 | Ahmadi et al. ............. 370/238 |
| 5,289,462 A | | 2/1994 | Ahmadi et al. |
| 5,313,454 A | * | 5/1994 | Bustini et al. .............. 370/231 |
| 5,317,566 A | | 5/1994 | Joshi |
| 5,367,523 A | | 11/1994 | Chang et al. |
| 5,428,781 A | | 6/1995 | Duault et al. |
| 5,452,294 A | * | 9/1995 | Natarajan .................... 370/351 |
| 5,467,341 A | | 11/1995 | Matsukane et al. |
| 5,477,536 A | * | 12/1995 | Picard ......................... 370/400 |
| 5,515,359 A | | 5/1996 | Zheng |
| 5,572,674 A | | 11/1996 | Ernst |
| 5,596,722 A | * | 1/1997 | Rahnema .................... 709/241 |
| 5,613,069 A | * | 3/1997 | Walker ........................ 709/238 |
| 5,654,958 A | * | 8/1997 | Natarajan .................... 370/410 |
| 5,729,152 A | | 3/1998 | Leung et al. |
| 5,740,164 A | | 4/1998 | Liron |
| 5,768,533 A | | 6/1998 | Ran |
| 5,802,054 A | * | 9/1998 | Bellenger ................... 370/401 |
| 5,995,539 A | * | 11/1999 | Miller ......................... 375/222 |
| 6,072,797 A | * | 6/2000 | Fletcher ...................... 370/394 |
| 6,081,511 A | * | 6/2000 | Carr et al. ................... 370/256 |
| 6,178,448 B1 | * | 1/2001 | Gray et al. .................. 709/224 |
| 6,542,514 B1 | * | 4/2003 | Yamada ....................... 370/432 |

OTHER PUBLICATIONS

Bird, R., *Advances in APPN architecture*, IBM Systems Journal, vol. 34, No. 3, pp. 430–451 (1995).

Huynh, L., et al., *Performance Comparison between TCP Slow–start and a New Adaptive Rate–based Congestion Avoidance Scheme*, Proceedings of the IEEE International Workshop on Modeling, Analysis, and Simulation of Computer and Telecommunication Systems, pp. 300–307 (1994).

(List continued on next page.)

*Primary Examiner*—Jason D Cardone
(74) *Attorney, Agent, or Firm*—D. Scott Moore; Myers Bigel Sibley & Sajovec; Jerry W. Herndon

(57) ABSTRACT

Methods, apparatus and computer program products are provided for distributing communication packets over multiple concurrent parallel links between a first node and a second node in a communication network based upon link quality information for the links. By utilizing link quality information from the links, the rate at which packets are provided to the links may be made proportional to the quality of the link, and thus, the link's ability to transmit the packet. The rate at which packets are provided to links may be reduced when error rates on a link exceed a specified threshold and eliminated when error rates exceed a higher threshold. Alternatively, timing delays from errors on a link may be used to determine a delay factor for a link and packets scheduled to the links based on the link with the lowest delay. The present invention is particularly useful in High Performance Routing Multilink Transmission Groups.

15 Claims, 8 Drawing Sheets

OTHER PUBLICATIONS

*Accunet T1.5 Service Description and Interface Specification*, AT&T Document TR62411, pp. 7–12 (Dec. 1990).

Rose, O., *The Q–bit Scheme—Congestion Avoidance using Rate–Adaption, Computer Communications Review*, vol. 22, No. 2 (Apr. 1992).

Gerla, M., et al., *Flow Control: A Comparative Survey, IEEE Transactions on Communications*, vol. 28, No. 4, pp. 553–574 (Apr. 1980).

*Systems Network Architecture: APPN Architecture Reference*, IBM Publication No. SC30–3422–04, pp. 1.1–1.48, 3.13–3.15, 7.1–7.114, 10.1–10.50.

Huitema, C, *Routing in the Internet*, pp. 109–111, 147–148, 279–309 (Prentice–Hall 1995).

Tran–Gia, P., et al., *Throughput Analysis of a Class of Selective Repeat Protocols in High–Speed Environments, IBM Research Report No. 1739*, pp. 1–23 (Sep. 1988).

Schwartz, M., *Telecommunication Networks: Protocols, Modeling and Analysis*, pp. 131–134, 153–156 (Addison–Wesley, 1987).

Traynham, K., et al., *Data Link Control and Contemporary Data Links, IBM Technical Report No. TR–29.0168*, pp. 5–7, 13–16 (Jun. 1977).

* cited by examiner

OPTIMAL LINK SCHEDULING FOR MULTIPLE LINKS

This application is a divisional of U.S. application Ser. No. 08/878,006, filed Jun. 18, 1997 now U.S. Pat. No. 6,178,448.

FIELD OF THE INVENTION

The present invention relates to communications networks and more particularly to communications networks having multiple physical links, paths, connections or virtual circuits between two nodes.

BACKGROUND OF THE INVENTION

In recent years there has been a proliferation in the networking of computer systems. The recent expansion of the Internet is just one example of the trend toward distributed computing and information sharing. In most forms of computer or communication networking there are communication paths between the computers in the networks. These paths may include multiple links or hops between intermediate equipment in a path. Thus, a communication may be originated by a first computer and pass through several links before reaching the destination computer. The control over these communications is typically carried out under a networking architecture. Many networking architectures exist for defining communications between computers in a network. For example, System Network Architecture (SNA) and Transfer Control Protocol/Internet Protocol (TCP/IP) are two examples of existing network architectures.

One existing network architecture for controlling communications between computers is known as Advanced Peer to Peer Networking (APPN). APPN, like many networking architectures, is based upon the transmission of data packets where a communication is broken into one or more "packets" of data which are then transmitted from the source to the destination over the communication path. Packet based communications allows for error recovery of less than an entire communication which improves communication reliability and allows for packets to take multiple paths to an end destination thus improving communicaton availability.

One error condition which many networks attempt to correct for is packet loss. Packet loss in a network may be broadly characterized as resulting from congestion on the path from the source to the destination or from loss of data (bit error) by links in the path. Congestion may result from too high a data packet rate for a path. Bit error may, however, result from any number of failures in a communication link. For example, sun spots may adversely impact microwave transmissions and cause loss of data. However, bit error occurrences are generally highly correlated. As a result, a time averaged bit error rate (BER) alone may not accurately describe line quality. Line quality is, therefore, usually described using a combination of an average BER over some time period along with the number of seconds in the time period in which one or more bit errors occur.

While APPN has proven to be a reliable networking architecture, as computer networking demands have increased these demands have created a demand for network architectures which utilize the higher performance communication systems and computer systems currently available. In part because of these demands, High Performance Routing, which is an enhancement to APPN, was developed. Processing capability has increased and become less expensive. This has driven the need for larger peer-to-peer networks. Link technology has advanced by several orders of magnitude over the past decade. Advances in wide area links have dramatically increased transmission rates and decreased error rates. Thus, to take advantage of these advances HPR provides high speed data routing which includes end-to-end recovery (i.e. error recovery is performed by the sending and receiving systems) and end-to-end flow and congestion control where the flow of data is controlled by the sending and receiving systems.

HPR consists of two main components: the Rapid Transport Protocol (RTP) and automatic network routing (ANR). RTP is a connection-oriented, full-duplex transport protocol designed to support high speed networks. One feature of RTP is to provide end-to-end error recovery, with optional link level recovery. RTP also provides end-to-end flow/ congestion control. Unlike TCP's reactive congestion control, RTP provides an adaptive rate based mechanism (ARB).

ARB provides end-to-end flow control to prevent buffer overrun at the RTP endpoints, a rate based transmission mechanism that smooths input traffic and a preventive congestion control mechanism that detects the onset of congestion and reduces the RTP send rate until the congestion has cleared. The ARB preventive congestion control mechanism attempts to operate the network at a point below the "cliff" (shown in FIG. 1) and to prevent congestion. A reactive mechanism, on the other hand, detects when the network has entered the region of congestion and reacts by reducing the offered load.

In RTP, the ARB mechanism is implemented at the endpoints of an RTP connection. Each endpoint has an ARB sender and an ARB receiver. The ARB sender periodically queries the receiver by sending a rate request to the ARB receiver who responds with a rate reply message. The sender adjusts its send rate based on information received in the rate reply message.

The mechanism used to control the send_rate is as follows. A burst_size parameter sets the maximum number of bytes a sender can send in a given burst at a given send_rate. During each burst_time, defined by burst_size/ send_rate, a sender is allowed to send a maximum of burst_size bytes. The receiver continuously monitors network queuing delay looking for the initial stages of congestion. Based on this assessment and also based on the current state of the receiver's buffers, the receiver sends a message to the sender instructing it to either increment the send_rate by a rate increment, keep the send_rate the same, decrement the send_rate by 12.5%, decrement the send_rate by 25%, or decrement the send_rate by 50%.

The receiver initiates error recovery as soon as it detects an out of sequence packet by sending a gap detect message that identifies the packets that need to be resent. When the sender receives a gap detect message, it drops its send_rate by 50% and resends the packets at the next send opportunity. If the sender does not get a response to a rate request within a time-out period, the sender assumes the packet is lost and cuts the send_rate by half, increases the rate request time-out exponentially (exponential back off), and transmits a rate request at the next send opportunity.

Thus, like many forms of networking, in RTP packet losses are assumed to result from congestion rather than bit errors. Such an assumption may often be valid for modern digital wide area links which exhibit low loss rates. However, these loss rates may not apply to all communication links around the world or even to high quality links all the time.

Furthermore, as RTP provides end-to-end flow control, the send rate of packets on a path may be limited by the slowest link in the path (i.e., the bottle-neck link). Thus, despite a path having high-speed links in the path if a single low-speed link is present, the sender and receiver will pace the transmission of packets to accommodate the low speed link. Thus, a congestion problem or the presence of one low speed link in a path may degrade the throughput for the entire path.

One way to improve congestion problems or to compensate for differing transmission rates on a communications path is to provide for multiple links between connection points that may be the bottle-neck in the path. HPR provides for such concurrent links through a Multilink Transmission Group (MLTG). Similarly, TCP/IP provides ofr multiple links with multi-link Point to Point Protocol (PPP). A transmission group is a logical group of one or more links between adjacent nodes that appears as a single path to the routing layer. A MLTG is a transmission group that includes more than one link. Links in a MLTG are referred to herein as sublinks. An MLTG can include any combination of link types (e.g., token-ring, SDLC, frame relay). MLTGs provide increased bandwidth which may be added or deleted incrementally on demand. Furthermore, the combined full bandwidth is available to a session since session traffic can flow over all sublinks in the group. MLTGs also provide increased availability. An individual sublink failure is transparent to sessions using the MLTG.

One drawback of an MLTG is that packets flowing over an MLTG can arrive at the RTP endpoint out of sequence. Thus, RTP must know if an MLTG is in a path. At connection establishment, RTP learns if there is an MLTG in the path. If an MLTG is not in the path, any data received that is out of sequence causes error recovery (i.e., the receiver sends a gap detect message to the sender). If an MLTG is in the path, error recovery is delayed. When the receiver detects out of sequence packets, it initiates a time-out procedure before sending the gap detect message. The time-out procedure allows enough time for all packets to arrive before initiating recovery.

The addition of an MLTG to a path also requires the endpoints of the MLTG to schedule packets to the sublinks of the MLTG. This distribution of packets among the concurrent links is presently accomplished in a number of ways, including round-robin, weighted round-robin and link metered pacing approaches. In a round-robin approach packets are distributed to sublinks in the MLTG by a simple sequential distribution to the links. This approach, however, does not take into account the possibility of differing link rates as well as possible congestion on a link or bit errors on a link in the MLTG.

In the weighted round-robin scheme, the scheduler maintains a count field for each sublink. Going in a fixed (round robin) order, the scheduler assigns a first group of packets to a first sublink, then assigns a second group of packets to a second sublink and so on through all of the links. The count field for a sublink is incremented each time a packet has been assigned to it. Once the count field equals the weight of the sublink, the scheduler moves on to the next sublink in the list. The weight values determine the relative frequency of use of each sublink by the MLTG scheduler. For example, if an MLTG consists of 2 sublinks with weights of 1 and 2 respectively, then the sublink with weight 2 will be allocated twice as much data as the other sublink. However, if the right mixture of dynamics does not exist, it is possible that the flow distribution over the sublinks will deviate from the optimal flow specified by the weights. For example, if small packets flow over one link while large packets flow over another link, the result will be sub optimal RTP throughput (a similar effect occurs if the sublink weight values are incorrect). Furthermore, if loss occurs on one of the sublinks, there is no mechanism to account for the change in throughput of the sublink.

For example, as seen in FIG. 2, at a sustained BER of $10^{-6}$, an RTP connection over a single 1500000 BPS link would have an effective throughput of 100000 BPS. With a 2 link MLTG, if one 750,000 BPS link experienced a sustained BER of $10^{-6}$, the RTP throughput would be roughly 250000 BPS. The error free link would be significantly underutilized (less than 25%). The solid "O" curve in FIG. 2 illustrates the results of a simulation of RTP performance over an MLTG with two sublinks. The curve illustrates one of several problems associated with running RTP over MLTG. At some point, in this case at a BER of about $3*10^{-7}$, RTP performs worse than if there was just a single (well behaved) link. This inefficiency follows from each packet loss resulting in a send_rate reduction of 50% to both links in the MLTG.

Furthermore, with any weight based MLTG scheduling system the algorithm is dependent on accurate weight values. A weighted round-robin algorithm requires static weights that must be as close to optimal as possible. The weight values typically are based on link speeds and provide a simple way to load balance the flow over the sublinks. Inaccuracy in weighting may be a significant problem given the number of multiprotocol link and subnet technologies (e.g., PPP, X.25, multiprotocol encapsulation over frame relay, multiprotocol encapsulation over ATM AAL5), it may be impossible to know the exact throughput available to a particular protocol over a multiprotocol link layer. Consequently, it may be impossible to know the correct weight values that should be assigned to each sublink.

An incremental extension to weighted round-robin MLTG scheduling adds a simple check before the scheduler assigns a packet to a sublink. If the sublink is in error recovery, it will not be used until the link has recovered. To implement this, the MLTG scheduler must monitor when a sublink goes in and out of error recovery state. If the sublink is in error recovery, the packet is submitted to another available sublink. If all links are in recovery, the packet is queued in an MLTG queue until a sublink is available. However, such error recovery may provide minimal improvement over the simple weighted round-robin method. By the time it is learned that a sublink is in recovery, it is too late. The scheduler might have scheduled many packets to the sublink. Also, when operating over a lossy sublink, the link may toggle in and out of error recovery frequently.

The next MLTG scheduling method, which is referred to as link metered pacing, is based on the SEND_MU signal defined by SNA architecture. The Data Link Control layer (DLC) issues a SEND_MU signal to Path Control when it is ready to accept additional frames for transmission. The mechanism allows component level pacing between the DLC and Path Control layers. An Error Recovery Protocol (ERP) DLC typically issues a SEND_MU after one or more frames have been successfully acknowledged. The SEND_MU signal provides the mechanism by which the MLTG scheduler sends a controlled amount of data to a sublink (call this amount the MAX_TOKENS) and then waits for a request for more data. The idea is to keep enough data queued in the DLC to keep the transmitter busy, but to have an upper bound so that the DLC queue level is controlled. If a link goes into error recovery (ER), the queue buildup occurs in the MLTG queue allowing RTP to quickly detect and react to the congestion. Therefore, link metered pacing avoids the queue explosion that can occur with the round-robin methods.

In one manner of implementing link metered pacing, MLTG maintains a MAX_TOKENS variable for each sublink in the transmission group that represents the maximum number of packets that can be sent to a sublink DLC at any time. A PACING_TOKEN_COUNT variable tracks the number of available tokens at any time. The count is initially set to the MAX_TOKENS value. The MLTG scheduler decrements the count as it assigns packets to a sublink. To ensure even flow over all sublinks, the scheduler implements a simple round robin scheduling policy for sublinks that have not run out of tokens. Once a sublink's PACING_TOKEN_COUNT reaches 0, MLTG stops using the sublink. Once a sublink is out of tokens, any other sublink with tokens is used, even if this means violating the round robin sequence.

The sublink DLC has a DLC_SEND_COUNT variable. Each time a frame is acknowledged, the count is incremented. Once the DLC_SEND_COUNT reaches a threshold (call-this the DLC_THRESHOLD), the DLC increments the PACING_TOKEN_COUNT by the DLC_THRESHOLD value. The DLC_SEND_COUNT is then reset to 0. As an alternative to a counting technique, a sublink DLC can implement its part of the link metered pacing mechanism by issuing the SEND_MU after each time it completes transmission of a packet from its transmit queue (rather than from a retransmit queue). If a sublink DLC goes into error recovery, it draws packets from its retransmit queue. Thus, there is a natural pacing mechanism that stops the flow of packets from MLTG to the sublink DLC when the sublink link experiences delays due to recovery.

The dashed "+" curve in FIG. 3 illustrates simulation results for a link metered pacing method where bit error loss is present on one of the sublinks. As seen in FIG. 3, RTP throughput collapses in the range of $10^{-5}$. The results show significant improvement over the round robin method (the solid "+" curve illustrates a reound robin scheduling method with error recovery enabled and the solid "0" illustrates a round robin scheduling method where error recovery is disabled). However, the throughput of the MLTG still falls below that of using a single sublink if the bit error rate is large enough. An optimized value of MAX_TOKENS may be utilized to improve performance, but this value still depends on statically configured link speed and propagation delay estimates. Obtaining accurate estimates may be difficult without a dynamic measurement. Also, as link quality deteriorates, the original MAX_TOKENS value is no longer optimal.

SUMMARY OF THE INVENTION

In view of the above discussion, it is an object of the present invention to provide improved flow control through multiple concurrent links in a network.

A further object of the present invention is to account for non-congestion based losses in networks having concurrent multiple links between nodes.

Yet another object of the present invention is to increase the efficiency of a group of multiple concurrent links in a network path when losses of packets on a link in the group of multiple concurrent links occurs.

Still another object of the present invention is to provide a manner of scheduling packets to multiple concurrent links.

Another object of the present invention is to reduce the impact on the efficiency of functional links in a group of multiple concurrent links resulting from packet losses on one of the links.

These and other objects of the present invention are provided by distributing communication packets over multiple concurrent parallel links between a first node and a second node in a communication network based upon link quality information for the links. By utilizing link quality information from the links, the rate at which packets are provided to the links may be made proportional to the quality of the link, and thus, the link's ability to transmit the packet.

In one embodiment, communication packets are provided to individual links of the multiple links at a packet transfer rate and link quality information for at least one link of the multiple links is obtained. The packet transfer rate to the link is reduced if the link quality information obtained for the link indicates that transmission quality of the link is below a first predefined threshold. In such a case link quality information may be bit error rate information and the transmission quality of the link is below a first predefined threshold if the link quality information indicates a bit error rate of greater than a predefined error rate.

Furthermore, the quality information may be the number of errors occurring during a time interval. In this instance, the bit error rate may be estimated by dividing the number of errors occurring during a time interval by the total amount of data sent to the link during the time interval.

In another embodiment, the packet transfers to a link are terminated if the link quality information received from the link indicates that transmission quality of the link is below a second predefined threshold. Where transmission quality if measured by bit error rates, the transmission quality of the a link may be below a second predefined threshold if the link quality information indicates a bit error rate of greater than a second predefined error rate.

In particular embodiments of the present invention, communication packets are provided to the links by a weighted round-robin method of packet distribution. Alternatively, communication packets may be provided to individual links of the multiple links by a link metered pacing method of packet distribution.

In these threshold embodiments of the present invention, the rate at which packets are provided to a link of the multiple links is based upon whether the transmission quality of the link is above or below a threshold. By decreasing the rate at which packets are provided to individual links as those links performance degrades, retry timeouts may be avoided and performance of the multiple links may be maintained. Furthermore, by providing no or only a few packets to a link if the link has too high an error rate the impact on the other links in the group of a links errors may be reduced.

In an alternative embodiment fo the present invention, packets are distributed to concurrent links by obtaining link quality information for each of a plurality of the multiple links. A delay factor associated with each of the plurality of links is determined and communication packets are distributed among the plurality of links based upon the delay factor associated with each of the plurality of links. The communication packets may be distributed to the links by providing communication packets to a link of the plurality of links with the least delay.

Furthermore, the delay factor may be the sum of an effective time to send and receive a packet for a link, a propagation delay for the link and an estimate of the queueing delay of the link. The effective time to send and receive a packet for a link may be determined from an estimated bit error rate for the link. Also, the bit error rate for the link may be estimated by dividing the number of errors occurring during a time interval by the total amount of data sent to the at least one link during the time interval. The estimate of the queuing delay of the link may be based upon the number of packets assigned to the link.

In addition to the distribution of packets to links based upon a delay factor, communication packet transfers to a link may be terminated if the link quality information received from the a link indicates that transmission quality of a link is below a predefined threshold.

By scheduling packets to links based upon the smallest delay factor the scheduler may reduce the impact of a link becoming a "lossy" link by reducing the rate at which packets are sent to that link. Furthermore, because the delay factors are calculated dynamically they automatically compensate for changes in loss rates for the links. Thus, a link which becomes lossy may recover and be useable at a later time. Also, by providing for a continuous compensation, rather than threshold oriented compensation, for loss in a link there is no need to set threshold values which may be incorrectly established.

In another embodiment of the present invention, the multiple links are a High Performance Routing (HPR) Multi-Link Transmission Group (MLTG). In such an embodiment, packets may be distributed to links in the MLTG by obtaining link quality information from links in the MLTG and scheduling data packets to the links of the MLTG based on the link quality information obtained form the links. Link quality information may be obtained by obtaining a retransmit count for a specified period of time from a SEND_MU signal from a link of the MLTG. Scheduling packets to the links may be carried out by determining an estimated bit error rate for a link based upon the retransmit count of the link and a count of the total bytes sent the link over the specified period of time. The send rate to the link may then be reduced if the estimate bit error rate is above a first predefined threshold. Furthermore, the link may be disabled if the estimated bit error rate for the link is greater than a second predefined threshold.

In another embodiment of the present invention, delay factors are determined for the links in the MLTG. Data packets are then scheduled to the links of the MLTG so as to schedule packets to the available link with the lowest delay factor. The delay factor may be calculated by calculating an estimated time delay for a link to transmit a packet. This time delay may be determined by solving:

$$DELAY=PS/(LS*MLE)+PD+(QL/2)/(LS*MLE)$$

wherein DELAY is an estimate of a delay (in seconds) that a packet experiences over the link, PS is a packet size measured in bits, LS is a link speed for the link, MLE is a measured link efficiency, PD is a propagation delay of the link and QL is an estimate of a current queue level of the link.

As will further be appreciated by those of skill in the art, the present invention may be embodied as a method, apparatus or computer program product.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by one of skill in the art, the present invention may be embodied as methods or devices. Accordingly, the present invention may take the form of an entirely hardware embodiment, an entirely software embodiment or an embodiment combining software and hardware aspects.

The present invention provides for scheduling of information packets to concurrent paths between two nodes in a communication path. The present invention is a form of "striping" where packets are "striped" across multiple links. Thus, the present invention may be thought of as intelligent striping which utilizes information about specific links to stripe data across the links. Furthermore, the present invention may be applicable to striping at higher levels such as across multiple paths or multiple connections. One example of higher level striping may be striping across multiple paths in a TCP/IP network. In such a case the packet distribution between the parallel paths or connections would be based on path or connection quality information corresponding to the link quality information dicussed herein.

The present invention is described herein with respect to embodiments implementing HPR. However, as will be appreciated by those of skill in the art, the teachings of the present invention are not limited to HPR but may be applicable to any network which allows for concurrent paths between nodes. Thus, for example, in TCP/IP, multi-link PPP may benefit from scheduling packets based upon the present invention.

Figure 4:
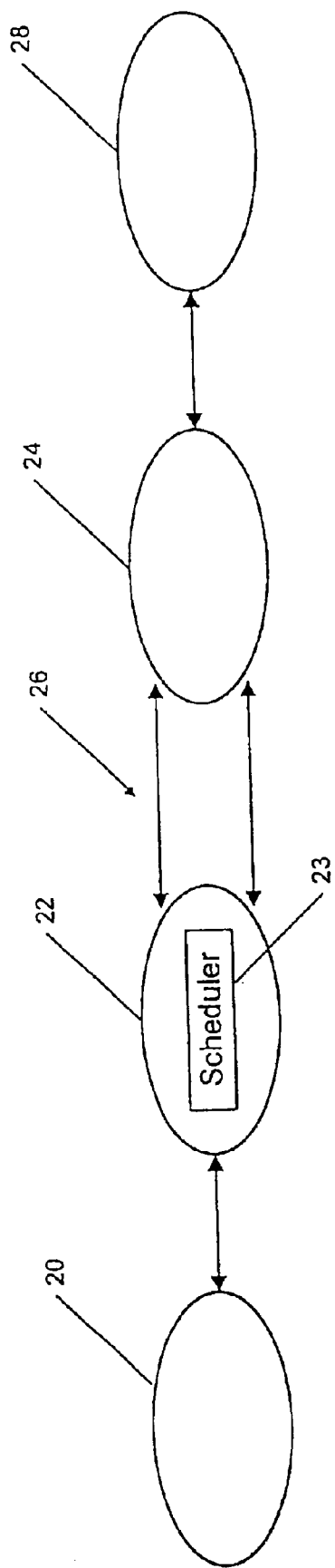
FIG. 4 is a block diagram of a network utilizing the present invention.

FIG. 4 is a block diagram illustrating a network communication path utilizing the present invention. As seen in FIG. 4, a first endpoint node 20 is connected to an intermediated node 22. The intermediate node 22 is connected to a second intermediate node 24 by concurrent links 26. For purposes of illustration, the concurrent links 26 are two links, however, as will be appreciated by those of skill in the art, the principles of the present invention may apply to scheduling information packets to any number of concurrent paths between two nodes. Intermediate node 24 is then connected to a second endpoint node 28.

Communications flow across the network from endpoint node to endpoint node in either direction. However, for purposes of illustration, communications will be described as originating with the first endpoint node 20 and being received by the second endpoint node 28. Thus, an example of a communication flow would be for the first endpoint node 20 to send communication packets to the first intermediate node 22. A scheduler 23 at the first intermediate node then distributes the communication packets among the links of the concurrent links 26 and transmits the packets to the second intermediate node 24. The second intermediate node 24 receives the packets from the first intermediate node 22 and sends them on to the second endpoint 28.

The distribution of packets over multiple concurrent links 26 between the first node 22 and the second node 24 involves distributing communication packets to links of the multiple links based upon link quality information for the links. This distribution based upon a quality assessment of a link in the group of concurrent links 26 may be carried out in several ways. Two such ways are illustrated in FIG. 5 and FIG. 6.

The present invention will now be described with respect to FIG. 5 and FIG. 6 which are flowcharts illustrating exemplary embodiments of the present invention. It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

Figure 5:
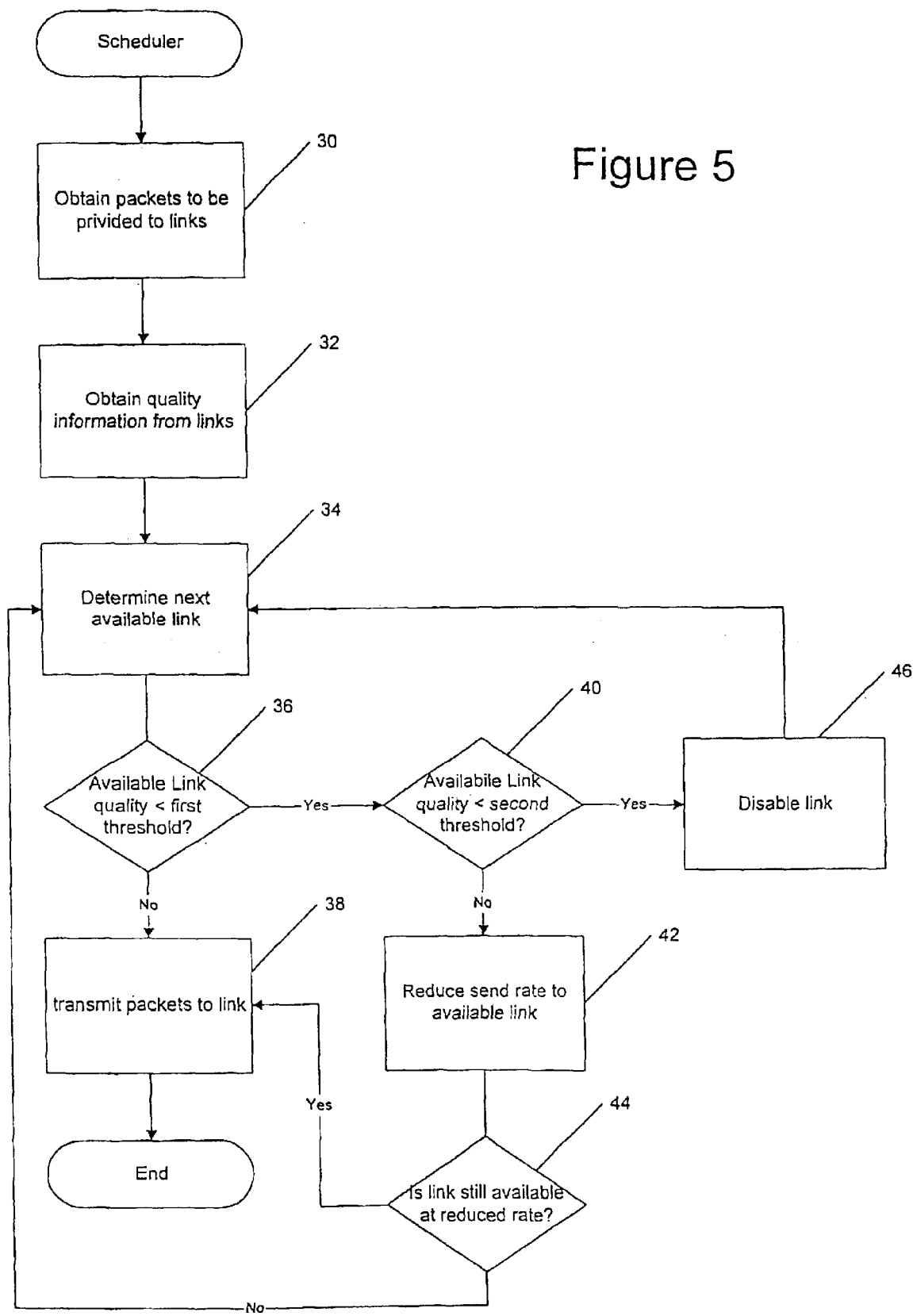
FIG. 5 is a flow chart illustrating one embodiment of the present invention.
Figure 6:
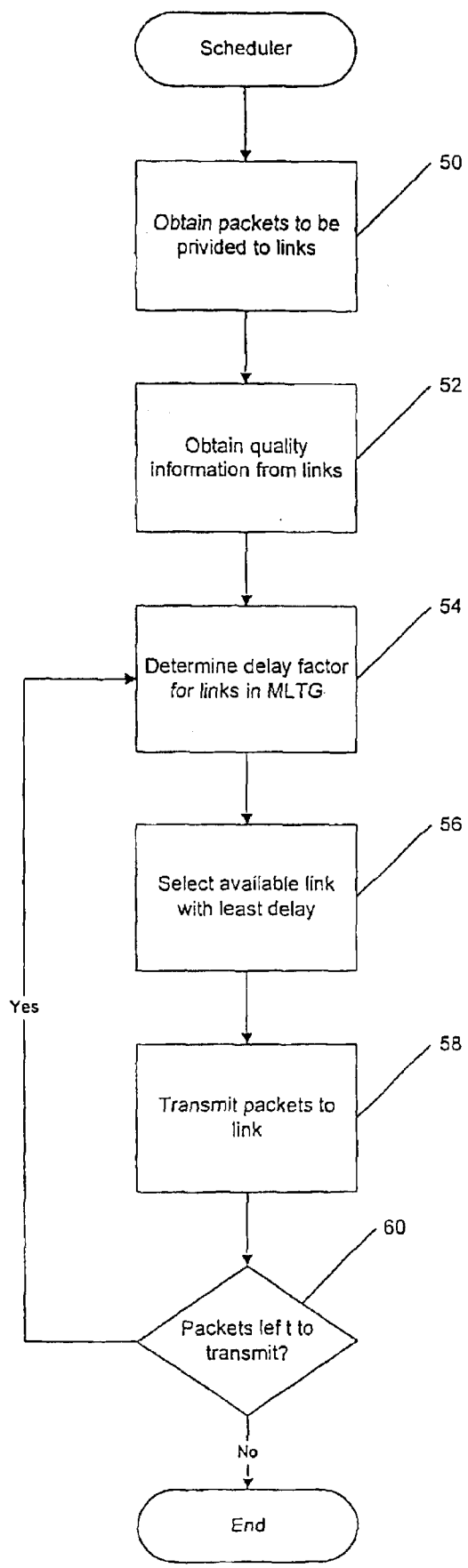
FIG. 6 is a flow chart illustrating a second embodiment of the present invention.

As seen in FIG. 5 a scheduler 23 at a first node 22 (the sending node) having multiple concurrent links 26 connecting the node to a second node 24 (the receiving node) may begin distribution of packets across the multiple links by obtaining the packets to be provided to the links (block 30). The scheduler 23 also obtains quality information about the links (block 32). The quality information may be a bit error rate for the link or it may be the number of retransmitted packets for the link or other information from which a link quality may be determined by the scheduler 23. The quality information may be any information which allows the scheduler 23 to determine the relative efficiency of a link in comparison to the other links in the group.

The scheduler 23 determines the next link to transmit information to (block 34) and then determines if the link quality of the link is below a first threshold (block 36). If the quality of the link is not below the first threshold value then the packets are transmitted to the link (block 38) and the scheduling of those packets is complete. If additional packets are to be transmitted (block 48) then the process is repeated from block 36.

If however, the link quality is below the first threshold, then the scheduler 23 determines if the link quality is below a second threshold, lower than the first threshold (block 40). If the link quality is not below the second threshold, then the send rate to the link is reduced (block 42) to the link. The scheduler 23 then determines if the link is still available at this reduced send rate (block 44) (i.e. at the reduced rate does the link already have a full queue of data packets). If the link is still available, then the packets are transmitted to the link at the reduced send rate (block 38). However, if the link is not available, then the next available link is determined (block 34) and the process repeated.

Returning to block 40, if the link quality of the link is below the second threshold, then the link is considered not functional and is disabled (block 46). Optionally, the link may be periodically monitored to determine if the link has regained functionality so that it may be reactivated and utilized in subsequent transmissions of packets.

Figure 1:
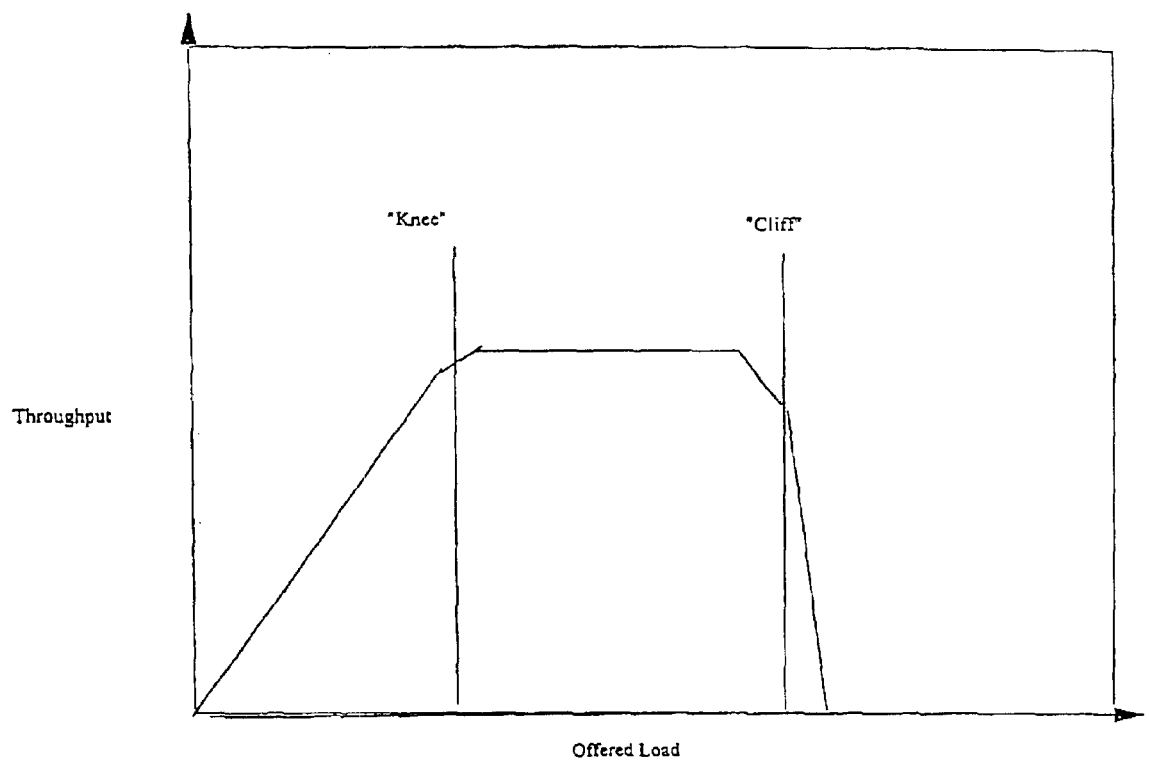
FIG. 1 is a graph of the performance of the throughput of a communication path versus the input rate to the path.
Figure 2:
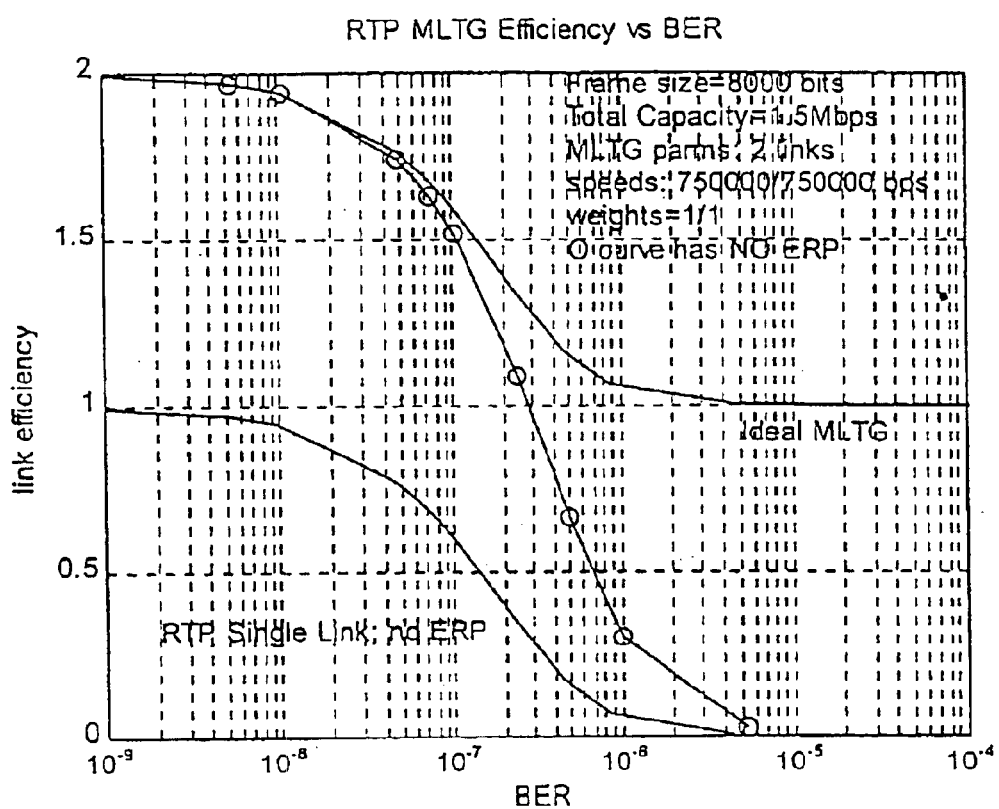
FIG. 2 is a graph of efficiency of a two sublink MLTG versus bit error rate of one sublink in the MLTG utilizing a conventional round-robin scheduling method.
Figure 3:
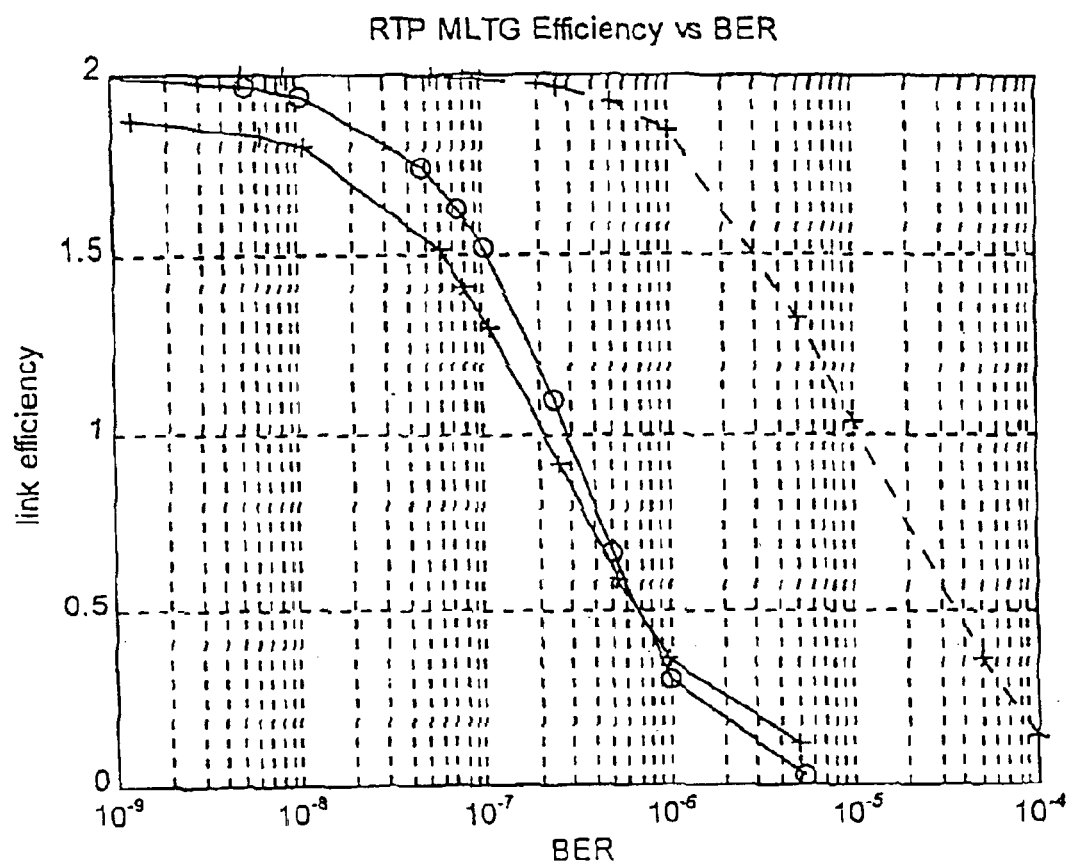
FIG. 3 is a graph of efficiency of a two sublink MLTG utilizing a conventional link metered pacing scheduling method versus bit error rate of one sublink in the MLTG.

Thus, the embodiment of the present invention illustrated in FIG. 5 provides for varying the send rate to a link in a group of concurrent links by reducing the send rate to the link if the link quality, based on quality information received from the link, falls below a first threshold and disabling the link if the link quality falls below a second threshold. The specification of these threshold may vary from network to network but the first threshold will typically be established at a level such as the "cliff" illustrated in FIG. 1. The second threshold value will typically be set at a value where degradation of one link in a group of concurrent links causes a reduction in efficiency of the other links in the group (i.e. where the throughput of the group of links is less than the sum of the normal throughput of the functioning links).

In selecting available links, the scheduler 23 may utilize any method of link selection, such as round-robin, weighted round-robin, link metered pacing or other methods known to those of skill in the art. Furthermore, based upon the particular method of selection and the network architecture, the actual manner in which packets are provided to links or send rates are reduced for a link may vary. Thus, for example, the weights in a weighted round-robin approach could be revised based on link quality to alter the send rate to a link. Similarly, in a link metered pacing approach the maximum number of packets sent to a link could be reduced to reduce the send rate to the link. As these examples illustrate, there may be many ways to reduce send rates to a link and these may be architecture specific. Furthermore, while FIG. 5 illustrates the link quality assessment as integrated with the distribution of packets, as will be appreciated by those of skill in the art, the link quality assessment and establishing of send rates to a link may be separate from the distribution and simply modify the distribution parameters such that a convention distribution method is utilized with parameters optimized by a link quality assessment procedure.

FIG. 6 illustrates an alternative embodiment of the present invention. As seen in FIG. 6, a scheduler 23 at a first node 22 (the sending node) having multiple concurrent links 26 connecting the node to a second node 24 (the receiving node) may begin distribution of packets across the multiple links by obtaining the packets to be provided to the links (block 50). The scheduler 23 also obtains quality information about the links (block 52). As with the previous embodiment, the quality information may be a bit error rate for the link or it may be the number of retransmitted packets for the link or other information from which a link quality may be determined by the scheduler 23.

The scheduler 23 determines a delay factor for the links in the group (block 54) based on the quality information from the links. This delay factor may be determined utilizing the following equation:

Delay Factor=effective time to send and receive a packet+propagation delay of the link+queuing delay of the link.

The effective time to send and receive a packet may be determined from a link's bandwidth, the number of retransmitted packets for the link, the time period over which the packets were retransmitted and the number of packets sent to the link during that time period. The propagation delay for the link may be known and the queuing delay may be estimated by dividing the number of packets queued by the link by 2 and then multiplying that value by the effective time to send a packet. Other manners of determining a delay factor may be utilized, however, what should be determined is the relative rate at which the links in the group may transmit packets.

The scheduler 23 then selects the link with the least delay (block 56) and transmits the packets over that selected link (block 58). If the scheduler 23 cannot transmit all of the packets over the link with the least delay the process is then repeated to select the next link for transmitting packets (block 60).

Particular embodiments of the present invention utilized in an HPR network with a HPR MLTG will now be described as examples of the application of the principles of the present invention to a specific networking technology. Each of these embodiments modify conventional link meter pacing to improve efficiency of a MLTG. In each of these embodiments, MLTG monitors the sublink's line quality by periodically sampling the error rate. An estimate of the average error rate during a time interval can be found by dividing the number of errors that occurred during the time interval (which can be obtained from the DLC statistics) by the total amount of data sent during the interval. The correct frequency of the error measurements is primarily a function of the line speed and the bit error rate. The measurement period should be large enough to provide a statistically accurate error rate measurement. However, the measurements must be frequent enough to provide responsive feedback.

For a scheduler to calculate an error rate, the scheduler should have access to a DLC's retransmission error count statistic (the scheduler for the MLTG can maintain its own count of total bytes sent over the sublink during each interval). One way to obtain link quality information such as the retransmission error count is to have the DLC send the count back to the scheduler of the MLTG with each SEND_MU signal. Therefore, each time period (called a MEASUREMENT_INTERVAL threshold), an observed error rate is computed (the MEASURED_ERROR_RATE).

In a first threshold oriented embodiment, two error rate threshold values (MI_RTHR1 and MI_RTHR2) are defined and a state field (MLTG_STATE) that can be either STATE0, STATE1 or STATE2 is also defined. The values are defined as follows:

STATE0: The normal operating mode of the sublink.

STATE1: The sublink is lossy and should be given lower scheduling priority.

STATE2: The sublink is nonfunctional.

The non-functional state may either cause the link to be unused or may send a "trickle" of data to the sublink, continue to monitor statistics and once the measured error rate decreases, restore the sublink to its original scheduling priority. The link may also be temporarily stop using the sublink. However, in order to monitor the line, some sort of test data should be periodically sent over the link. For example, MLTG can send a packet with a bad destination address. The packet is dropped by the router at the other end of the link. However, the packet passes through the DLC layers allowing the DLC to update its statistics.

Each MEASUREMENT_INTERVAL, the MLTG scheduler performs the Sublink_State_Transition( ) function shown below to update the NEW_MLTG_STATE and the SUBLINK_WEIGHT_CHANGE value for each sublink.

```
Function Sublink_State_Transition    (Sublink_id)
    switch MLTG_STATE(Sublink_id)
    case (STATE0)
        if MEASURED_ERROR_RATE(Sublink_id) > MI_RTHR1
            NEW_MLTG_STATE(Sublink_id) = STATE1
                SUBLINK_WEIGHT_CHANGE(Sublink_id) =
        endif
    end
    case(STATE1)
        if MEASURED_ERROR_RATE(Sublink_id) <MI_RTHR1
            NEW_MLTG_STATE(Sublink_id) = STATE0
            SUBLINK_WEIGHT_CHANGE(Sublink_id) = 2
        endif
        if MEASURE_ERROR_RATE(Sublink_id) >
        MI_RTHR1 and
            MEASURE_ERROR_RATE(sublink_id) < MI_RTHR2
            do nothing
        else if MEASURE_ERROR_RATE(Sublink_id) >
        MI_RTHR2
            NEW_MLTG_STATE(Sublink_id) = STATE2
            SUBLINK_WEIGHT_CHANGE(Sublink_id) = 1
            Set SUBLINK_WEIGHT(Sublink_id) =
            0 to effectively stop using it
        endif
    end
    case(STATE2)
        if MEASURE_ERROR_RATE(Sublink_id) > MI_RTHR2
            continue sending a trickle of data . . .
        endif
        if MEASURE_ERROR_RATE(Sublink_id) < MI_RTHR1
            NEW_MLTG_STATE(Sublink_id) = STATE0
            SUBLINK_WEIGHT_CHANGE(Sublink_id) = 0
            restore SUBLINK_WEIGHT(Sublink_id) to the
            original relative weight
    end
```

Based on the current weights (i.e., the SUBLINK_WEIGHT vector) and the SUBLINK_WEIGHT_CHANGE vector, the sublink weights can be adjusted. The function that performs the adjustment is very simple. Rather than a global assessment based on information from each sublink, a sublink weight is simply scaled based on its SUBLINK_WEIGHT_CHANGE value. Preferably, the sublink weight values have a minimum value of 2 and are factors of 2. This revision of the sublink weights results in changes in the scheduling priority of the links such that a reduction in the sublink weight causes a reduction in the number of packets sent to the link. Thus, modifying the sublink weights causes the scheduler to modify the distribution of packets to the links.

In an alternative embodiment of the present invention utilizing thresholds, when the first error rate threshold is reached (MI_RTHR1), instead of modifying the weight values, the MAX_TOKENS value is reduced by ½. The DLC_THRESHOLD value does not have to be modified if the DLC issues SEND_MU signals after it receives an acknowledgment and if it has no more data to send. Reducing the MAX_TOKENS value reduces the maximum number of packets that can ever be queued in the sublink and reduces the MAX_OUT value of the DLC. Lowering the MAX_OUT value as a link experiences high packet loss may have minimal improvement on a full duplex DLC, however it can be a significant improvement for a half duplex DLC.

Once the sublink moves from STATE1 back to STATE0, the MAX_TOKENS value is restored. Once the second error rate threshold is reached (MI_RTHR2), MAX_TOKENS is set to 1 allowing only a trickle of data to flow over the lossy link. As with the previous embodiment, once the error rate improves, the link's MAX_TOKENS value is restored. Alternatively, the MAX_TOKENS value could be set to 0 to completely remove the link.

Figure 7:
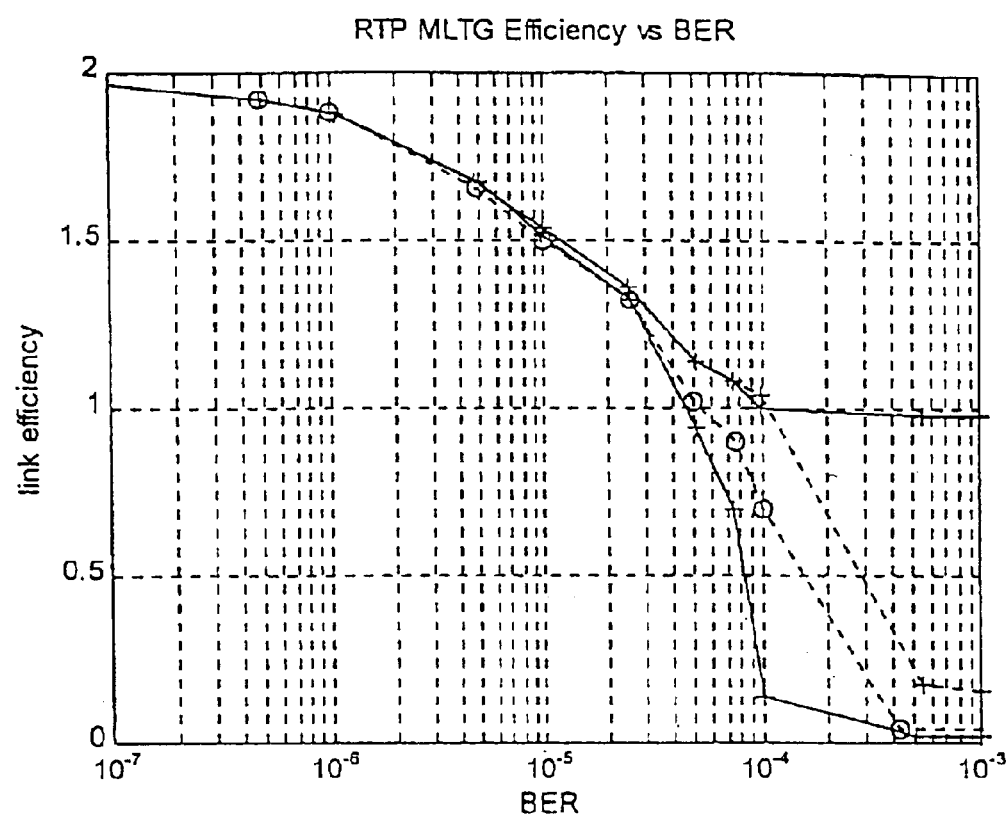
FIG. 7 is a graph of efficiency versus bit error rate for a one sublink of a two sublink MLTG utilizing embodiments of the present invention.

FIG. 7 illustrates the results of a simulation of the two threshold embodiments described above for a two link MLTG. In FIG. 7 the dashed "+" curve 72 of shows the improvement gained by dynamically updating the MAX_TOKENS value. The solid "+" line 70 is the unoptimized link metered pacing method (using a maximum token value of 7). The dashed "O" curve 74 is the result of dynamically updating the weight values. The solid "+" curve of FIG. 7 illustrates the result where once the measured error rate exceeds the MI_RTHR2_threshold, the link is removed (at least temporarily). The MI_RTHR2 error rate threshold is chosen such that MLTG stops using the full duplex link once its efficiency has been reduced to 0.1. This roughly corresponds to an increase in delay over the link by a factor of 10 which is large enough to trigger time-outs.

In a delay oriented embodiment of the present invention, scheduling decisions are based on an estimate of the anticipated delay associated with sending a packet over each sublink. In such an embodiment the flow distribution of packets over the sublinks is adjusted based on a real-time link error rate measurement. The anticipated delay is based on the following definition of expected delay that is associated with sending a packet over a particular sublink (assuming fifo queuing):

$$DELAY=PS/(LS*MLE)+PD+(QL/2)/(LS*MLE)$$

where DELAY is an estimate of the delay (in seconds) that a packet experiences over a particular link, PS is the packet's size measured in bits, LS is the link speed measured in bits per second, MLE is the measured link efficiency which is a real number from 0 to 1, PD is the propagation delay of the link and QL is an estimate of the current queue level of a particular sublink.

The measured link efficiency (MLE) can be found directly from the link statistics based on the total number of bytes sent and the total number of bytes retransmitted. Or the efficiency can be derived based on a measured error rate using an analytical model that expresses the DLC efficiency as a function of BER. The error rate is based on the number of errors divided by the total number of bytes sent.

The propagation delay can be an estimate, or ideally it is measured by the link (or MLTG) at link startup time.

Given that it is difficult to find sublink queue levels directly, QL can be estimated from the current queue length by assuming that the link has sent ½ the amount of data that has been assigned to it but not yet confirmed (i.e., QL is ½ the current value of the PACING_TOKEN_COUNT).

The delay calculation is done by the MLTG scheduler for each packet (although the MLE is calculated each measurement interval). As the line quality deteriorates on a sublink, the delay value increases.

As with the previously described embodiment, the present embodiment may dynamically adjust the MAX_TOKENS value. Such a scaling may modify a sublink's MAX_TOKENS value by scaling it each MEASUREMENT_INTERVAL by an amount proportional to the sublink's measured link efficiency (MLE). A procedure to dynamically modify the MAX_TOKENS value may be as follows:

```
MLE = Calculate_the_MLE( )
if MAX_TOKENS * MLE < bandwidth-delay product
if MLE < .35
        MAX_TOKENS = MLE * ORIGINAL_MAX_TOKENS
    endif
else
        MAX_TOKENS = MLE * ORIGINAL_MAX_TOKENS
    endif
    if MAX_TOKENS < 1
        MAX_TOKENS = 1
    endif
```

Simulation results show that for more moderate BER levels, reducing the MAX_TOKENS value is advantageous as long as it does not effectively decrease the DLC's MAX_OUT value to less than the bandwidth delay product. Simulation results have also shown that once the MLE drops below 0.35, it is beneficial to reduce the DLC's MAX_OUT value. Utilizing the above scaling, a minimum delay link metered method would then include the following operations:

(1) Set the MAX_TOKENS value to the bandwidth-delay product plus a little extra for internal delays. The DLC window size should be set to the same value, the DLC_THRESHOLD value should be set to 1. The DLC should issue a SEND_MU when any of the following conditions are true:
  (a) when a DLC_THRESHOLD number of packets have been acknowledged; or
  (b) when the DLC receives an acknowledgment, all other data has been acknowledged, and it has no more data to send.

(2) Each MEASUREMENT_INTERVAL, based on DLC statistics, an estimate of current link efficiency is calculated for each sublink in the MLTG. The MAX_TOKENS value for a sublink is scaled based on the process shown above. Therefore, the MI_STATE of STATE1 of the previous embodiment no longer exists since the MAX_TOKENS is adjusted continuously.

(3) Each time a packet is to be scheduled for transmission, MLTG:
  (a) Calculates the estimated delay to send this packet over each available link using the delay formula given above. Links that have run out of tokens are not considered available. If all links are unavailable, the packet is queued in the MLTG queue.
  (b) Transitions the link to the MI_STATE of STATE2 once a link's delay falls to 1/10 the size of any other sublink delay. This either permanently or temporarily removes the sublink from the transmission group.
  (c) Assigns the packet to an available link which offers the minimal delay.

Figure 8:
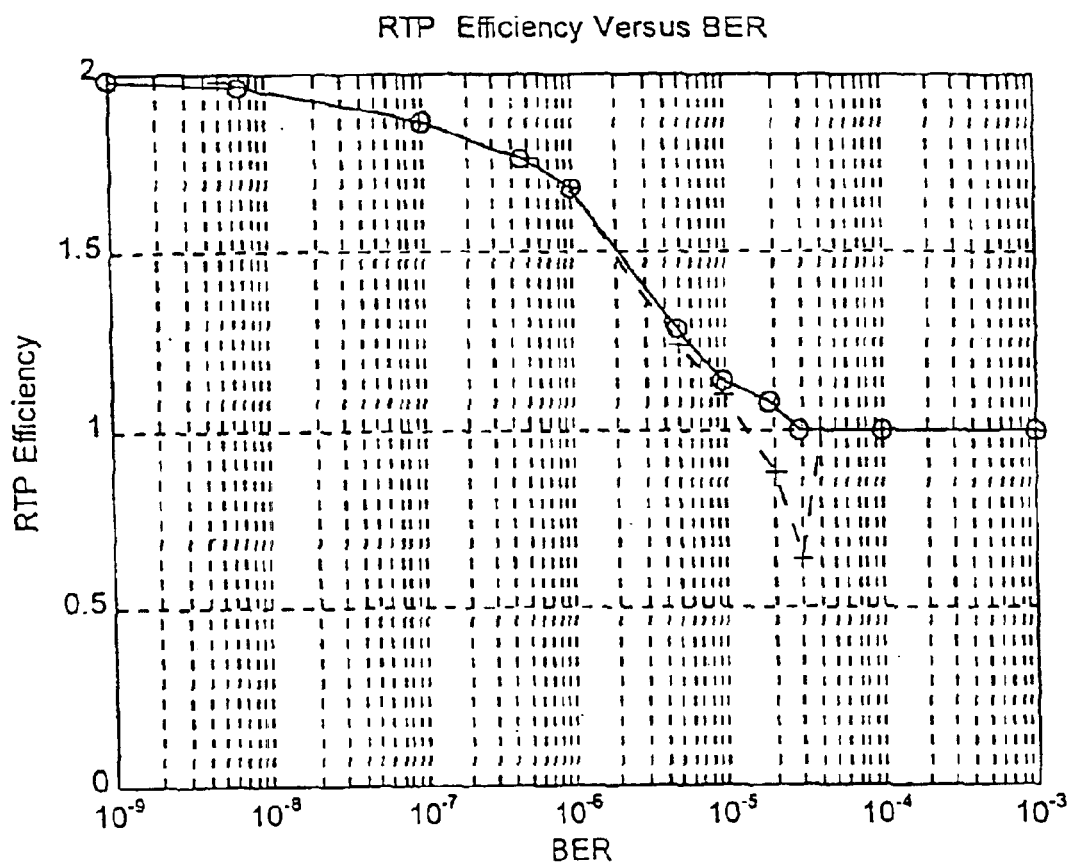
FIG. 8 is a graph of efficiency versus bit error rate for a one sublink of a two sublink MLTG utilizing threshold and minimal delay embodiments of the present invention.

FIG. 8 illustrates a comparison of simulation results for a two link MLTG utilizing the threshold embodiment and the delay embodiment of the present invention. The dashed "+" curve 80 represents the threshold embodiment. The solid "O" 82 curve represents the minimum delay embodiment of the present invention. FIG. 8 shows that the minimal delay embodiment is more tolerant of bit errors than the optimal link metered pacing algorithm.

One advantage of the minimal delay embodiment is that it is not dependent on an optimized MAX_TOKENS value (that is based on the bandwidth-delay product). The minimal delay embodiment may dynamically optimize the MAX_TOKENS value as delay over a sublink changes. As packet loss due to bit errors occurs, the MAX_TOKENS value is dynamically reduced to the bandwidth-delay product. Once the link efficiency decreases beyond a threshold, the MAX_TOKENS is scaled to further reduce the flow over the link.

The minimal delay embodiment also schedules each packet based on current conditions and availability of each sublink. Thus, the likelihood of timeouts resulting from differing delay times for a packet transmitted over differing links may be reduced.

The present invention has been described with reference to links and link quality information. As used herein, the term links may refer to a single physical connection or multiple serial physical connections between two nodes which may be nonadjacent nodes in a network. Thus, hops, links, virtual circuits or paths are all encompassed by the term links as used herein. However, preferably the present invention is utilized to stripe across single hop links in a multilink transmission group.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of striping communication packets over multiple concurrent parallel links between a first node and a second node in a communication network, the method comprising the steps of:
    obtaining link quality information for each of a plurality of the multiple links;
    determining a delay factor associated with each of the plurality of links for which link quality information is obtained, wherein determining the delay factor comprises determining for a link a sum of an effective time to send and receive a packet, a propagation delay for the link and an estimate of the queuing delay of the link; and
    distributing communication packets among the plurality of links based upon the delay factor associated with each of the plurality of links such that packets are provided to a link of the plurality of links with the smallest delay factor.

2. A method according to claim 1, wherein the effective time to send and receive a packet is determined from an estimated bit error rate for the link.

3. A method according to claim 2, wherein the bit error rate for the link is estimated by dividing the number of errors occurring during a time interval by the total amount of data sent to the at least one link during the time interval.

4. A method according to claim 1, wherein the estimate of the queuing delay of the link is based upon the number of packets assigned to the link.

5. A method according to claim 1, further comprising the step of terminating communication packet transfers to a link if the link quality information received from the link indicates that transmission quality of a link is below a predefined threshold.

6. A system for striping communication packets in a communication network comprising:
    means for obtaining link quality information for each of a plurality of the multiple links;
    means for determining a delay factor associated with each of the plurality of links for which link quality information is obtained, wherein the means for determining the delay factor comprises means for determining for a link a sum of an effective time to send and receive a packet, a propagation delay for the link and an estimate of the queuing delay of the link; and
    means for distributing communication packets among the plurality of links based upon the delay factor associated with each of the plurality of links such that packets are provided to a link of the plurality of links with the smallest delay factor.

7. A system according to claim 6, wherein the effective time to send and receive a packet is determined from an estimated bit error rate for the link.

8. A system according to claim 7, wherein the bit error rate for the link is estimated by dividing the number of errors occurring during a time interval by the total amount of data sent to the at least one link during the time interval.

9. A system according to claim 6, wherein the estimate of the queuing delay of the link is based upon the number of packets assigned to the link.

10. A system according to claim 6, further comprising means for terminating communication packet transfers to a link if the link quality information received from the link indicates that transmission quality of the link is below a predefined threshold.

11. A computer program product for striping communication packets in a communication network having multiple concurrent parallel links between a first node and a second node in the communication network, the computer program product comprising:
    computer-readable program code means for obtaining link quality information for each of a plurality of the multiple links;
    computer-readable program code means for determining a delay factor associated with each of the plurality of links for which link quality information is obtained, wherein the computer-readable program code means for determining the delay factor comprises computer-readable program code means for determining for a link a sum of an effective time to send and receive a packet, a propagation delay for the link and an estimate of the queuing delay of the link; and
    computer-readable program code means for distributing communication packets among the plurality of links based upon the delay factor associated with each of the plurality of links such that packets are provided to a link of the plurality of links with the smallest delay factor.

12. A computer program product according to claim 11, wherein the effective time to send and receive a packet is determined from an estimated bit error rate for the link.

13. A computer program product according to claim 12, wherein the bit error rate for the link is estimated by dividing the number of errors occurring during a time interval by the total amount of data sent to the at least one link during the time interval.

14. A computer program product according to claim 11, wherein the estimate of the queuing delay of the link is based upon the number of packets assigned to the link.

15. A computer program product according to claim 11, further comprising computer-readable program code means for determining communication packet transfers to a link if the link quality information received from the link indicates that transmission quality of the link is below a predefined threshold.

* * * * *